United States Patent [19]

Fleischer

[11] 3,855,477

[45] Dec. 17, 1974

[54] DETECTION AND MEASUREMENT OF RADIATION DAMAGE BY POLARIZED LIGHT

[75] Inventor: Robert L. Fleischer, Schenectady, N.Y.

[73] Assignee: General Electric Company, Schenectady, N.Y.

[22] Filed: Nov. 1, 1971

[21] Appl. No.: 194,428

[52] U.S. Cl. .............................. 250/473, 250/472
[51] Int. Cl. ............................................. G01t 5/10
[58] Field of Search ........................... 250/472, 473

[56] References Cited
UNITED STATES PATENTS

| 3,373,683 | 3/1968 | Alter | 250/472 X |
| 3,415,993 | 12/1968 | Fleischer et al. | 250/472 |
| 3,493,751 | 2/1970 | Davies et al. | 250/473 |
| 3,612,873 | 10/1971 | Alter | 250/472 X |

Primary Examiner—Archie R. Borchelt
Attorney, Agent, or Firm—Jane M. Binkowski; Joseph T. Cohen; Jerome C. Squillaro

[57] ABSTRACT

A process for detecting radiation damage which comprises exposing a surface of a thin sheet of a polarizing dielectric material to radiation to form tracks of radiation damaged material therein which pass through the thickness of the sheet. The sheet is then contacted with an etchant which selectively dissolves and removes the tracks of radiation damage material to form holes extending from one surface of the sheet through the opposite surface. The resulting holes are a measure of radiation damage and are detected by visual means by detecting the light which emerges from the holes on one side of the etched polarizing sheet while the opposite side of the etched sheet is irradiated with light polarized in a single plane which said etched sheet material by proper positioning absorbs sufficiently to provide a significant contrast to light passing through the holes.

6 Claims, 4 Drawing Figures

PATENTED DEC 17 1974 3,855,477
SHEET 1 OF 2
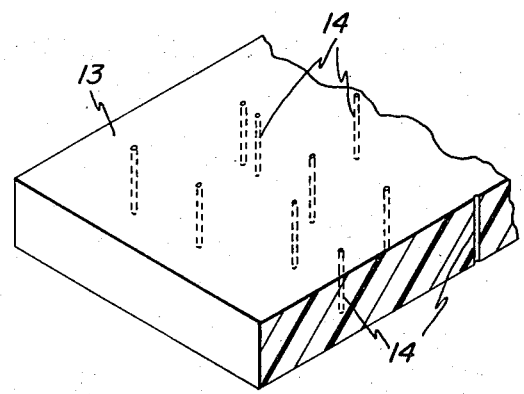
FIG. 1
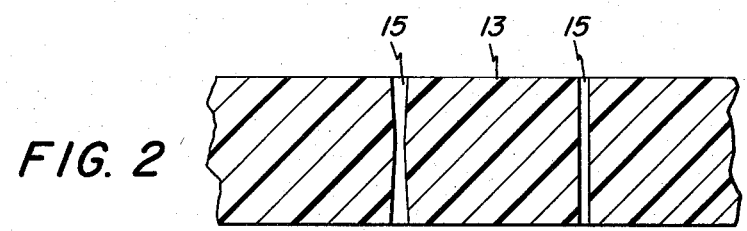
FIG. 2
FIG. 3
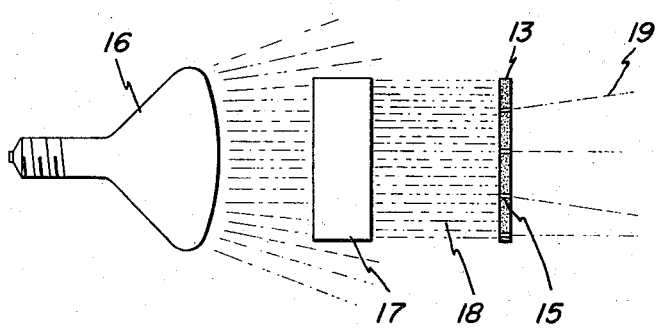

DETECTION AND MEASUREMENT OF RADIATION DAMAGE BY POLARIZED LIGHT

The present invention relates generally to the art of radiation detection and is more particularly concerned with the detection and measurement of radiation of widely-different types and levels of intensity, and with novel radiation measurement methods.

The pioneer radiation-etching method of forming or drilling holes through sheet materials disclosed and claimed in U.S. Pat No. 3,303,085 which issued Feb. 7, 1967, and assigned to the assignee hereof, results typically in a sheet product in which the holes or apertures are not visible to the naked eye. Consequently, when this method is employed in accordance with the radiation detection and measurement invention disclosed and claimed in U.S. Pat. No. 3,335,278 which issued on Aug. 8, 1967, and also assigned to the assignee hereof, it is not ordinarily possible to read directly and visually the results registered in the form of holes through the test sheet. In either instance, prolonged exposure of the irradiated sheet material to an appropriate etchant, as disclosed in the aforesaid patents, may result in enlargement of the openings through the test sheet until they become visible to the naked eye. This, however, involves delaying the read-out step and in some cases raises the problem of over-etching of the test sheet.

In U.S. Pat. No. 3,415,993 which issued on Dec. 10, 1968 and also assigned to the assignee hereof, a technique for detecting and measuring radiation damage is disclosed wherein one side of a sheet of radiation damage track-forming material is provided with a coating of a metal, the metal being one which dissolves at a rate faster than the radiation damaged material. The opposite surface of the sheet is left uncovered and exposed to a source of radiation to be detected and measured resulting in radiation damage tracks running through the sheet from one side surface to the other. The uncoated side of the sheet is then contacted with an etchant which selectively removes the tracks of damaged material to form holes therethrough and when it reaches the metal coating, it forms holes of considerably greater diameter therein than the holes in the sheet. These larger holes are much more easily seen and provide the means for detecting and measuring radiation damage.

In the present process, etched particle tracks are sensitively displayed by making them appear as light regions on a dark background. Specifically, when such holes are etched through a polarizing material and light having the orthogonal polarization to that of the polarizing material is caused to be incident, it is transmitted only through the holes. One particular advantage of this procedure is that it allows holes to be quickly recognized as points of light in a large detector area.

The present invention, together with further objects and advantages thereof, will be better understood from the following description taken in connection with the accompanying drawings, and its scope will be pointed out in the appended claims.

In the drawings:

FIG. 1 is an enlarged fragmentary view of a polarizing plastic sheet which has been exposed to radiation and which has tracks of radiation damaged material passing from one surface through the opposite surface.

FIG. 2 is a fragmentary enlarged cross-sectional view of a sample of the sheet of FIG. 1 after it has been etched to selectively dissolve and remove the tracks of radiation damaged material to form holes therein.

FIG. 3 is a schematic view illustrating a preferred method of detecting and measuring holes in the etched sheet material and thereby determining the radiation dosage to which it has been exposed.

Figure 4:
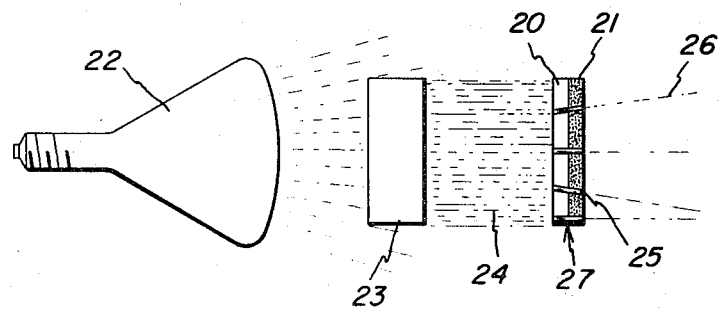
FIG. 4 is a schematic view substantially similar to FIG. 3 except that it illustrates a method of detecting and measuring holes in an etched laminated structure.

Briefly stated, the present process for detecting radiation damage comprises exposing a surface of a thin sheet of a polarizing dielectric material to radiation to form tracks of radiation damaged material therein which pass through the thickness of the sheet. The sheet is then contacted with an etchant which selectively dissolves and removes the tracks of radiation damaged material to form holes extending from one surface of the sheet through the opposite surface. The resulting holes are a measure of radiation damage and are detected by visual means by detecting the light which emerges from the holes on one side of the etched polarizing sheet or film while the opposite side of the etched film is irradiated with light polarized in a single plane which the etched sheet is positioned to absorb to provide a significant contrast to light passing through the holes therein. Specifically, to carry out the detection process, a source of unpolarized visible light is used along with a polarizer which polarizes the light by selective absorption, i.e., it transmits polarized light in a single plane. While this plane-polarized light is irradiated on one side of the etched polarizing sheet material, the etched sheet is positioned, i.e., turned, until it absorbs the plane-polarized light to become sufficiently or substantially darkened or opaque, to produce a visually significant contrast to the light passing through the holes therein.

In the present process a conventional lamp can be used as a source of unpolarized visible light. As is well-known in the art a beam of ordinary unpolarized light vibrates in all planes. These vibrations are considered as being composed of two components only, one-half of the waves vibrating in a vertical plane and the other half vibrating perpendicular to it. In the present process, a polarizer is used which is a material that selectively absorbs one of the components of light and transmits light polarized in a single plane. Typical examples of such polarizers include a crystal of tourmaline and films generally referred to as polaroid films wherein the polarizing material is, for example, a stretch-oriented sheet or film of non-hydrophilic poly(vinyl alcohol) or a cellulose film containing oriented iodoquinine sulphate crystals.

The dielectric polarizing material useful in forming the sheets or films of the present process is preferably a radiation damage track-forming material which also is a polarizing material. However, as used herein, the sheet of dielectric polarizing material can also be a laminated structure where at least one outside lamina is a radiation track-forming material and the lamina adhered to the outside lamina of radiation track-forming material is a lamina of polarizing material. Preferably, a laminated structure is used comprised of at least three laminae wherein at least one of the outer laminae is a radiation track-forming lamina and wherein the intermediate lamina is a polarizing material. The dielectric material is preferably a plastic which can be a thermosetting or thermoplastic polymer, particularly an organic polymer.

The particular material used depends largely on the type of radiation to be detected and measured, i.e., the extent to which the radiation or charged particles form tracks of radiation damaged material through the thickness of the dielectric polarizing material since certain materials are more easily damaged by radiation than others. Where the dielectric polarizing material is a laminated structure where at least one outside lamina is a radiation track-forming material and the lamina adhered to the outside lamina of radiation track-forming material is a lamina of polarizing material, tracks of radiation damaged material generally need only pass through the thickness of the track-forming lamina, although they may pass through both laminae, since the holes formed in such lamina can serve as the only means of contact of solvent with the polarizing material to form holes therein, i.e., the only holes formed in the lamina of polarizing material would be those associated with the holes in the track-forming lamina. Polymers such as the cellulose esters, particularly cellulose nitrate, are preferred since tracks of radiation damaged material are most easily formed therein by a wide range of radiation. Specifically, fission fragments and ions heavier than oxygen, such as argon, will form tracks of radiation damaged material in most plastics, i.e., inorganic as well as organic polymers. On the other hand, oxygen ions are effective with polymers such as the polycarbonates as well as the cellulose esters, whereas alpha particles are operable with the more easily damageable polymers such as the cellulose esters. Typical examples of polarizing materials include films generally referred to as polaroid films wherein the polarizing material is, for example, a stretch-oriented sheet or film of non-hydrophilic poly(vinyl alcohol) or a cellulose film containing oriented iodoquinine sulphate crystals.

The specific thickness of the dielectric polarizing material or the outside track-forming lamina in the case of a laminated structure may vary but it should be at least sufficiently thick that the undamaged, unirradiated portion of the material retains its continuity after the etching procedure is completed to form holes therein. For best results the dielectric polarizing material or track-forming lamina should have a minimum thickness of at least one micron. The maximum thickness of the material is limited by the range of the radiation, i.e., the bombarding charged particles, and the etchability or solubility of the material itself as well as its track-defining portions. Where fission fragments are to be detected, the material or track-forming lamina may have a maximum thickness of about 20 microns. For best results with fission fragments, the thickness of the material ranges from about 5 to about 18 microns.

The etching step to extract, i.e., to dissolve and remove, the tracks of radiation damaged material to form holes through the thickness of the dielectric polarizing material can be carried out in a number of ways. For example, where the dielectric polarizing material is a single sheet, it can be immersed in a solution of the etchant until a sufficient amount of the radiation damaged material in the tracks has been removed to form holes through the thickness of the sheet. Upon completion of the etching step, the etched sheet should be treated to remove the etchant, as for example, by rinsing with water. This procedure can also be used when the dielectric polarizing material is a laminated structure where the etchant for dissolving and removing the tracks of radiation damaged material from the radiation track-forming lamina has no significant deteriorating effect on the remaining portion of the laminated structure, otherwise the etchant should be contacted substantially only with the surface of the radiation track-forming lamina to remove the tracks of radiation-damaged material therein.

The etchant or solvent used to dissolve and remove the radiation damaged material will also act to dissolve or attack the unirradiated, undamaged portion of the material but such attack is at a rate significantly lower than that on the radiation damaged material, and therefore, it will only be the etching of the tracks of radiation damaged material which will result in holes in the etched material.

Generally, the etchant is a liquid. The particular etchant used and its concentration in solution depends on the extractability, i.e., the dissolution and removal of the tracks of radiation damaged material. Typical etchants include hydrofluoric acid, sodium hydroxide, potassium hydroxide, and potassium permanganate. Typical solvents for polarizing materials include toluene and benzene.

The holes in the etched dielectric polarizing material are a measure of radiation damage. As used herein the word hole indicates a hole extending in a substantially straight line from one surface of the dielectric polarizing material through the opposite surface of the material.

FIG. 1 shows tracks 14 of radiation damaged material in a sheet of dielectric polarizing plastic 13. FIG. 2 shows the sheet 13 after it has been contacted with an etchant which has selectively dissolved and removed the tracks of radiation damaged material to form holes 15 therein. FIG. 3 illustrates one technique of the present process for detecting and measuring holes 15. Specifically, in FIG. 3, a polarizer 17 is mounted in association with a source of unpolarized visible light 16. The polarizer 17 is a material which selectively absorbs a component of the unpolarized light and transmits light polarized in a single plane. While the plane-polarized light 18 is irradiated on one side of etched sheet 13, the sheet 13 is positioned, i.e., turned, to absorb the plane-polarized light until it becomes sufficiently or substantially darkened or opaque to produce a significant contrast to the light passing through holes 15. The holes are detected by means of light 19 emerging on the opposite side of the sheet. FIG. 4 is substantially the same as FIG. 3 except that an etched laminated structure 27 is used comprised of two laminae 20 and 21 where lamina 20 is a radiation track-forming material and lamina 21 is a polarizing material. Specifically, in FIG. 4, the polarizer 23 is mounted in association with a source of unpolarized visible light 22 as shown to selectively absorb a component of the unpolarized light and transmit light polarized in a single plane 24. While the plane-polarized light 24 is irradiated on one side of etched laminated structure 27, the structure 27 is positioned, i.e., turned, until lamina 21 absorbs the plane-polarized light sufficiently to make it appear substantially opaque in the light thereby producing a significant contrast to that portion of the plane-polarized light which passes through holes 25. The light 26 passing through holes 25 and emerging on the opposite side of the laminated structure 27 indicates the location of the holes.

To further enhance the hole visibility and accelerate detection of radiation damage, the side of the etched sheet from which the visible light emerges can be covered with a photographic plate or luminescent screen. As the light passing through the etched sheet impinges on the photographic plate or luminescent screen, it is more highly visible, i.e., it results in a higher resolution. Also, the image of the hole on the plate or screen can increase with intensity of the irradiated light or time due to halo effects in the etched sheet itself if it is made of plastic or in the luminescent screen.

As one application of the present process, the sheet of dielectric polarizing material can be supported in a personnel badge or otherwise suitably supported in a radiation environment as disclosed and claimed in aforesaid U.S. Pat. No. 3,335,278, the entire disclosure of which is incorporated herein by reference, and the present process used to detect the radiation damage therein.

If desired, to further simplify the present radiation detection process, a photographic print is made of the light passing through the holes of the etched material or of the images of such light. The radiation detection and measurements are then made from the photographic print.

The invention is further illustrated by the following example.

EXAMPLE

A polymer film material sold under the trademark Polacoat Polarized Material was used. This film had a thickness of about 250 microns and was comprised of a thin layer of polarizing material supported by a substrate which was a significantly thicker layer of substantially inert plastic material. The polarizing material was believed to be a cellulose film containing oriented iodoquinine sulphate crystals. A sheet of polycarbonate sold under the trademark Macrofol having a thickness of about 6 microns was placed over the layer of polarizing material and the resulting sandwich was heat-compressed at a temperature of about 190°C under a pressure of about 5 psi to form a laminated structure.

The resulting laminate was exposed to a source of Californium-252 fission fragments for ¼ hour in a substantial vacuum to produce tracks of radiation damage through the polycarbonate and polarizing laminae of the laminate.

An etchant comprised of 6.25N sodium hydroxide solution which was maintained at a temperature of 60°C was used to dissolve and remove the tracks of radiation damaged material from the polycarbonate lamina. Specifically, the laminate was immersed in the etchant for 75 minutes, then rinsed with water and dried in air. A solvent was then used at room temperature comprised of 10 parts by volume ethanol and one part by volume toluene to form holes in the intermediate layer of polarizing material. Specifically, the etched laminate was immersed in this solvent for 8 minutes, then rinsed with water containing about 0.1 percent by volume ammonium hydroxide and dried in air.

The holes extending through the polycarbonate and polarizing laminae were not visible to the unaided eye. To locate the etched holes, a Leitz Ortholux Polarizing Microscope was used to provide polarized light. The etched laminate was placed in the microscope and polarized light was irradiated on the bottom side thereof, i.e., the inert plastic substrate. The laminate was turned in the microscope until a visually significant contrast between the light passing through the holes extending through the polarizing material and polycarbonate laminae was produced thereby allowing visual location of the holes. Specifically, each hole appeared as a white dot against a dark background and each white dot had a small dark dot substantially at its center. The small dark dot indicated the hole formed in the polycarbonate lamina and the significantly larger surrounding white dot indicated the corresponding larger hole formed in the intermediate layer of polarizing material.

In copending U.S. Pat. application Ser. No. 194,362, now U.S. Pat. No. 3,770,962 entitled "Radiation Detection Method" filed of even date herewith in the names of Robert L. Fleischer and Robert M. Walker, and assigned to the assignee hereof there is disclosed a process for detecting and measuring radiation damage which comprises providing a sheet of a dielectric translucent or transparent material having a thickness of at least about 1 micron, exposing said sheet to radiation to produce tracks of radiation damaged material therein extending from one surface through the opposite surface of said sheet, contacting said sheet with an etchant to selectively dissolve and remove said tracks of damaged material to form holes therein passing from one surface through the opposite surface of said sheet, irradiating light on one side of said sheet having a wavelength which is sufficiently absorbed by said sheet to provide a significant contrast to light passing through said holes, and detecting the light passing through said holes on the opposite side of said sheet. This patent application is, by reference, made part of the disclosure of the present application.

What I claim as new and desire to secure by Letters Patent of the United States is:

1. A process for detecting and measuring radiation damage which comprises providing a sheet of dielectric polarizing material having a thickness of at least about 1 micron, exposing said dielectric polarizing sheet to radiation to produce tracks of radiation damaged material therein extending from one surface through the opposite surface thereof, contacting said sheet with an etchant to selectively dissolve and remove said tracks of damaged material to form holes therein passing from one surface through the opposite surface thereof, said holes in the resulting etched polarizing sheet not being visible to the unaided eye, irradiating unpolarized visible light on a side of a polarizer which polarizes the light by selective absorption to transmit visible light polarized in a single plane, irradiating said visible light polarized in a single plane on one side of said etched polarizing sheet, and while said visible polarized light is irradiated on one side of said etched polarizing sheet positioning said sheet until it substantially blocks transmission of said visible polarized light and appears substantially opaque in said polarized light resulting in passage of said visible polarized light only through said holes in said sheet, said visible polarized light emerging from said holes on the opposite side of said sheet indicating the presence of said holes.

2. A process according to claim 1 wherein said sheet of dielectric polarizing material is plastic.

3. A process for detecting and measuring radiation damage which comprises providing a dielectric polarizing laminated structure comprised of at least a first lamina and a second lamina, said first lamina being a radiation track-forming material at least 1 micron in thickness and said second lamina being a polarizing material, exposing said first lamina to radiation to produce tracks of radiation damaged material therein extending from one surface through its opposite surface, contacting said laminated structure with an etchant or solvent to selectively dissolve and remove said tracks of damaged material to form holes passing from one surface through the opposite surface of said laminated structure, said holes in the resulting etched laminated structure not being visible to the unaided eye, irradiating unpolarized visible light on a side of a polarizer which polarizes the light by selective absorption to transmit visible light polarized in a single plane, irradiating said visible light polarized in a single plane on one side of said etched laminated structure, and while said visible polarized light is irradiated on one side of said etched laminated structure positioning said laminated structure until it substantially blocks transmission of said visible polarized light and appears substantially opaque in said visible polarized light resulting in passage of said visible polarized light only through said holes in said laminated structure, said visible polarized light emerging from said holes on the opposite side of said laminated structure indicating the presence of said holes.

4. A process according to claim 3 wherein said tracks of radiation damaged material extend through said laminated structure.

5. A process according to claim 1 wherein said laminated structure is plastic.

6. A process according to claim 5 wherein said first lamina is a polycarbonate and said second lamina is a cellulose film containing oriented iodoquinine sulphate crystals.

* * * * *